Figure 1:
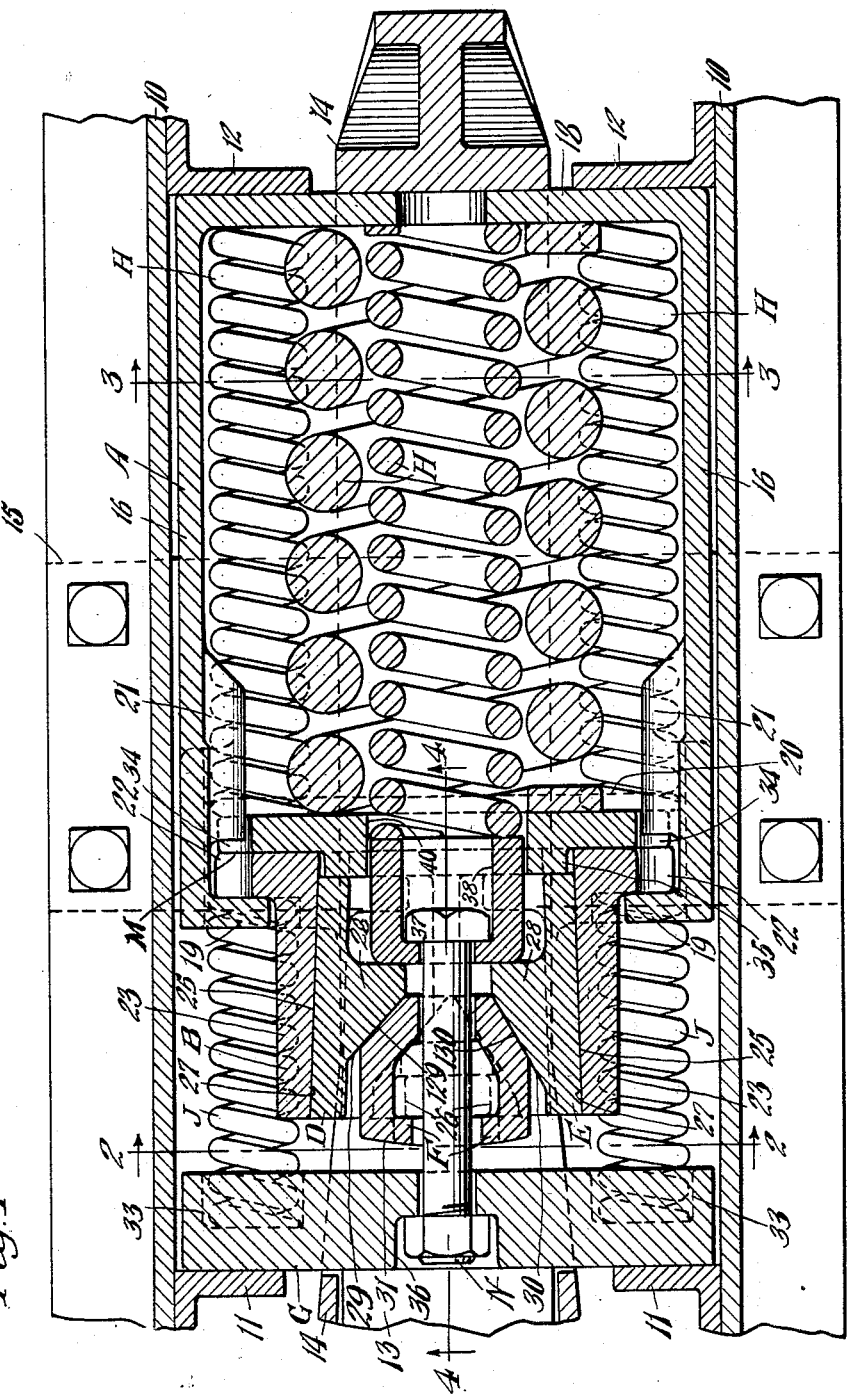

May 31, 1932.   S. B. HASELTINE   1,860,540
FRICTION SHOCK ABSORBING MECHANISM
Filed Aug. 1, 1929   2 Sheets-Sheet 1

Witness
Wm. Geiger

Inventor
Stacy B. Haseltine
By Joseph Harris
His Atty.

May 31, 1932. S. B. HASELTINE 1,860,540
FRICTION SHOCK ABSORBING MECHANISM
Filed Aug. 1, 1929 2 Sheets-Sheet 2
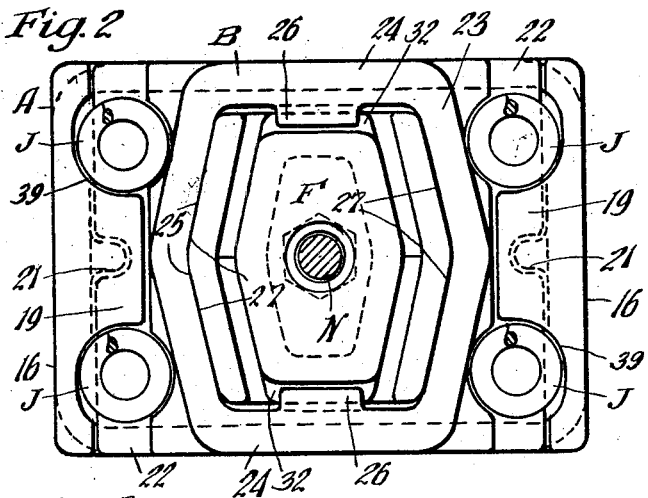
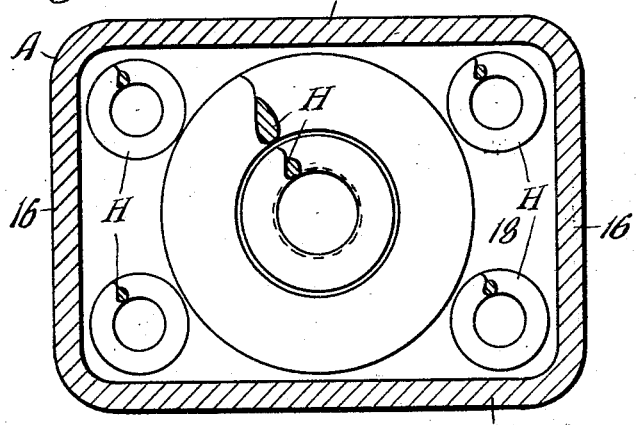
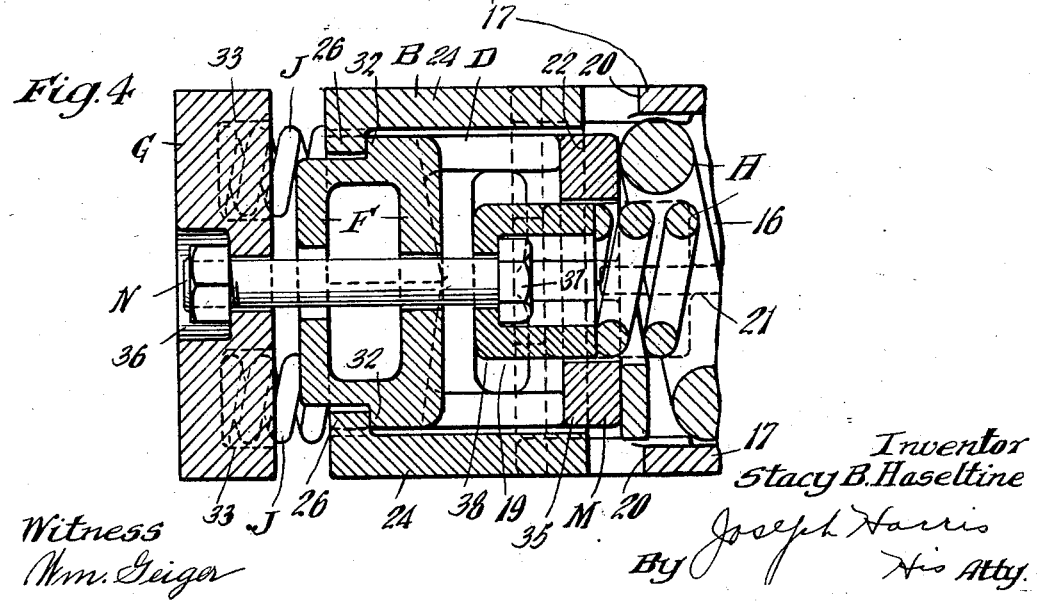
Inventor
Stacy B. Haseltine
By Joseph Harris
His Atty.
Witness
Wm. Geiger Patented May 31, 1932

1,860,540

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed August 1, 1929. Serial No. 382,771.

This invention relates to improvements in friction shock absorbing mechanisms.

One object of the invention is to provide a friction shock absorbing mechanism including front and rear follower-acting members relatively movable with respect to each other; a friction member having restricted movement with respect to one of said follower members and limited to less than the full compression stroke of the mechanism; spring resistance means opposing relative movement of said friction means and the cooperating follower member; friction elements movable with respect to the friction means and actuated by the other follower member, movement of said friction elements being resisted by said spring means; and additional spring means resisting relative movement of said follower members, thereby providing graduated spring action produced by compression of said last named and first named spring resistance means successively, followed by heavier friction resistance due to relative sliding movement of the friction means and friction elements.

A further object of the invention is to provide a friction shock absorbing mechanism including a friction casing; friction elements having sliding movement with respect to the casing, said elements including a wedge member; spring resistance means opposing relative movement of the friction means and casing; a main follower, said follower and casing being relatively movable toward and away from each other and said follower being normally spaced from the wedge means; spring resistance means opposing relative movement of the casing and follower; and anchoring means for the follower limiting relative separation of the same and the casing.

A further object of the invention is to provide a friction shock absorbing mechanism including a spring cage; a friction shell, said shell and cage having relative movement restricted to less than the full compression stroke of the mechanism; friction means movable with respect to the shell after movement of the latter has been arrested; a main follower movable with respect to the spring cage for actuating said friction means; means for anchoring the follower to limit outward movement thereof with respect to the spring cage; spring resistance means opposing relative movement of the friction shell and spring cage and also opposing movement of the friction elements; and spring resistance means opposing relative movement of the main follower and friction shell, the main follower being normally spaced from the friction means whereby said last named spring resistance is compressed during the first part of the compression stroke, followed successively by compression of said first named spring to the extent of relative movement of the shell and cage, and relative sliding movement of the friction means and elements to provide for graduated spring action to absorb the lighter shocks and heavier frictional resistance to absorb the ultimate heavy shocks.

A still further object of the invention is to provide a friction shock absorbing mechanism including a relatively movable friction shell and spring cage, relative movement of which is restricted to less than the full compression stroke of the mechanism; friction shoes cooperating with the friction shell; a wedge member having wedging engagement with the shoes; a main follower normally spaced from the wedge member, said main follower and cage being relatively movable; spring resistance means within the cage opposing inward movement of the shell and also opposing inward movement of the friction shoes with respect to the shell; spring resistance means opposing relative movement of the friction shell and main follower; means for anchoring the wedge to the shell to hold the same assembled therewith and limit outward movement thereof; and anchoring means for holding the main follower assembled with the cage and limiting relative separation thereof.

Other objects of the invention will more clearly appear from the description and claims hereinafter following.

In the drawings, forming a part of this specification, Figure 1 is a horizontal, longitudinal sectional view through the underframe structure of a railway car illustrating my improvements in connection therewith. Figures 2 and 3 are vertical, transverse sectional views corresponding respectively to the lines 2—2 and 3—3 of Figure 1. And Figure 4 is a vertical, longitudinal, sectional view of the front end portion of my improved shock absorbing mechanism, corresponding substantially to the line 4—4 of Figure 1.

In said drawings, 10—10 indicate channel-shaped center or draft sills of the railway car underframe, to the inner sides of which are secured front stop lugs 11—11 and rear stop lugs 12—12. The inner end portion of the coupler shank is designated by 13 and a hooded yoke 14 of well known form is operatively connected to the coupler shank. My improved shock absorbing mechanism is disposed within the yoke, and the yoke in turn is supported by a detachable saddle plate 15 secured to the bottom flanges of the draft sills 10.

My improved shock absorbing mechanism comprises broadly a spring cage A; a friction shell B; a pair of friction shoes D and E; a wedge F; a main follower member G; a main spring resistance H; a preliminary spring resistance J; a spring follower M; and a retainer bolt N.

The spring cage A is in the form of a rectangular box-like casing having spaced longitudinally extending side walls 16—16; horizontally disposed spaced top and bottom walls 17—17 and a transverse vertical rear end wall 18 co-operating with the stop lugs 12 in the manner of the usual rear follower. At the forward end, the side walls 16 of the casing are provided with inturned vertical flanges 19—19 and the top and bottom walls 17—17 are cut away rearwardly of said flanges as indicated at 20—20 to provide top and bottom openings to permit assembling of the spring follower and friction shell with the cage. The side walls of the cage are provided with interior guide ribs 21—21 at the forward ends thereof, the guide ribs being spaced inwardly from the flanges 19 as clearly shown in Figure 1, the spacing being less than that of the front end edges of the walls 17 with respect to the flanges 19.

The friction shell B is also preferably in the form of a substantially box-like member and is provided with laterally extending side flanges 22—22 at the inner end thereof which are disposed in back of the flanges 19 of the spring cage A. The friction shell has longitudinally extending side walls 23—23 of substantially V-shape section and horizontally disposed connecting top and bottom walls 24—24. The side walls 23 present V-shape interior friction surfaces 25—25 extending lengthwise of the shell. As most clearly shown in Figure 1, the V-shaped friction surfaces 25 converge inwardly of the mechanism. The top and bottom walls of the friction shell are provided with interior retaining lugs 26—26 at the forward end thereof which cooperate with the wedge block F in a manner hereinafter pointed out to hold the wedge assembled with the shell.

The friction shoes D and E are of similar design except as hereinafter pointed out. Each shoe has a V-shaped outer friction surface 27 which cooperates with the friction surface 25 at the corresponding side of the shell B. On the inner side each shoe is provided with a lateral enlargement 28 having a wedge face at the forward side thereof, the wedge face of the shoe D being indicated by 29 and the wedge face of the shoe E being indicated by 30. As shown, the wedge face 30 of the shoe E is inclined at a keener angle with respect to the longitudinal axis of the mechanism than the wedge face 29 of the shoe D. The wedge face 30 is preferably disposed at a keen-acting wedging angle, while the wedge face 29 is disposed at a relatively blunt releasing angle. The wedge faces 29 and 30 of the shoes are also of V-shaped section as most clearly shown in Figure 2.

The wedge F is in the form of a block and has a convex outer end face 31 adapted to cooperate with the main follower member G. At the inner end of the block F is provided with wedge faces 129 and 130 on the opposite sides thereof cooperating respectively with the wedge faces 29 and 30 of the shoes D and E and correspondingly inclined thereto. The wedge faces 129 and 130 are also of V-shaped section so as to properly cooperates with the wedge faces of the shoes. As will be evident, the inter-engaging V-shaped faces of the wedge, shoes, and shell prevent relative vertical displacement of these members with respect to each other, thereby holding the same out of contact with the top and bottom walls of the shell. As clearly shown in Figure 2, the wedge and shoes are spaced from the top and bottom shell walls. At the forward end, the wedge is cut away at the top and bottom sides as shown in Figures 2 and 3, thereby providing transverse retaining shoulders 32—32, which cooperate with the lugs 26 of the shell B to hold the wedge assembled therewith and limit its outward movement.

The main follower G is in the form of a substantially rectangular heavy plate-like member cooperating with the front stop lugs 11 of the railway draft rigging. On the inner side, the main follower member G is provided with top and bottom pockets 33—33 at opposite sides thereof adapted to form seats for the front end portions of the elements of the preliminary spring resistance J.

The main spring resistance H includes a central spring member and four additional spring members disposed about the same, the last named spring members being arranged in the four corners of the spring cage A. The central spring member of the spring resistance H comprises a relatively light inner coil and a heavier outer coil. All of the members of the main spring resistance bear directly on the end wall 18 of the spring cage and with the exception of the inner coil of the central spring member have their front ends bearing directly on the spring follower M.

The spring follower M is in the form of a plate-like member and is interposed between the inner end of the friction shell B and the spring resistance H. As shown in Figures 1 and 2, the spring follower M is notched at opposite sides as indicated at 34—34 to receive the guide ribs 21 of the cage. As will be evident, the spring follower is thus guided by the ribs 21 during movement lengthwise of the cage. At the forward side the spring follower is provided with a rectangular boss-like member 35 which engages within the inner end of the friction shell in the normal full release position of the parts, thereby preventing accidental vertical displacement of the shell with respect to the cage and locking the same in assembled relation with the latter. The spring follower is further provided with a central opening 40 for a purpose hereinafter pointed out.

The preliminary spring resistance J comprises four relatively light coils arranged in pairs at opposite sides of the friction shell B and interposed between the flanges 22 of the shell and the main follower G. The front ends of the coils of the springs J are seated in the pockets 33 provided in the main follower G. As shown in Figure 2, the flanges 19 of the spring cage A are cut away as indicated at 39—39 to provide clearance for the inner ends of the coils of the spring resistance J.

The retainer bolt N has the front end thereof anchored to the main follower G, the follower being provided with a pocket 36 adapted to accommodate the nut of the bolt. The shank of the bolt extends through alined openings in the main follower G and wedge block F. The inner end of the bolt is headed as indicated at 37 and a spring washer or thimble 38 is connected thereto, the head of the bolt being accommodated within the thimble, the latter bearing on the enlargements 28 of the friction shoes D and E. The retainer bolt is so adjusted that the preliminary spring resistance J is under initial compression, thereby compensating for wear of the cooperating wedge faces of the wedge block and shoes and the cooperating friction surfaces of the shoes and friction shell. The thimble 38 extends into the opening 40 of the spring follower, is freely movable therein and bears directly on the front end of the inner coil of the central spring member.

As shown in Figure 4, most clearly, the spring follower M is of such a height that it will pass freely into the spring cage between the top and bottom walls thereof, while the friction shell is of such a height that the inner end of the same will engage the front edges of the top and bottom walls of the spring cage after a certain amount of compression of the mechanism to arrest movement of the friction shell with respect to the cage. In order to allow the unobstructed inward movement of the friction shell, the flanges 22 thereof are notched at opposite sides so as to clear the guide ribs 21 of the spring cage.

In assembling my improved shock absorbing mechanism, the wedge and friction shoes are inserted within the friction shell so that the shoulders of the wedge engage in back of the shell shoulders, and the retainer bolt and thimble are placed in position with the head of the bolt seated in the thimble and the shank extending through the wedge, and the parts are then assembled with the spring cage in the following manner: The spring resistance H is first inserted in the spring cage through the open front end thereof, and the spring follower is then assembled with the cage by inserting the same laterally between the flanges 19 and the front end edge of the top wall 17. The spring follower is then forced inwardly to a sufficient extent that the boss 35 thereof will clear the inner end of the friction shell and thimble while being assembled with the cage. The shell with the wedge, shoes, thimble and retainer bolt assembled therewith is then attached to the cage by inserting the flanges 22 thereof laterally between the flanges 19 and the front end edge of the top wall 17 of the cage. After the shell has been brought into proper horizontal position, the spring follower M is permitted to move outwardly, thereby causing engagement of the enlargement 35 within the friction shell. The spring resistance elements of the preliminary spring resistance J are then placed in position and the front follower G applied and secured by the retainer bolt N. When the parts are completely assembled, both the main spring resistance H and the preliminary spring resistance J are preferably under initial compression, the former holding the spring follower engaged with the inner end of the friction shell and the latter holding the friction shoes in contact with the wedge block and friction surfaces of the shell. Inasmuch as the inner coil of the central member of the spring H directly engages the thimble 38 and is preferably under initial compression, the same at all times holds the friction shoes in intimate contact with the wedge faces of the shoes and friction surfaces of the shell, thus compensating for wear thereof.

The operation of my improved shock absorbing mechanism during either a draft or buffing action is as follows: The main follower G and spring cage A will be moved relatively inwardly toward each other, thereby compressing the preliminary spring resistance J during the initial portion of the compression stroke. During this time the friction shell will be held in its outermost position by the action of the main spring resistance H which is of considerably greater capacity than the spring resistance J.

During the continued inward movement of the main follower with respect to the spring cage, the former will come into engagement with the wedge block F, causing the latter to move inwardly toward the spring cage in unison therewith. Due to the frictional resistance between the friction shoes and the wedge and between the shoes and the shell, the latter will be forced inwardly in unison with the main follower G, thereby carrying the spring follower M and spring cap 38 inwardly also and compressing the main spring resistance H. In this connection, it is pointed out that the enlargement 35 at the front side of the spring follower bears on the inner ends of the friction shoes, thereby assuring that the shoes and shell will move inwardly in unison. The movement of the friction shell inwardly of the cage with the main follower G will continue until the shell engages the front end edges of the top and bottom walls 17 of the cage whereupon relative movement of the shell and cage will be arrested, thereby compelling the friction shoes to move inwardly on the friction surfaces of the shell. During the inward movement of the friction shoes with respect to the shell, the main spring resistance H will be further compressed. It should also be noted that the four coils of the preliminary spring resistance J will also be further compressed during this stage of the operation. Inward movement of the main follower is finally limited by engagement with the front end of the friction shell, whereupon the shell together with the spring cage act as a solid column load-transmitting means to transmit the actuating force directly to the stop lugs of the draft sills and prevent undue compression of the preliminary and main spring resistance elements.

When the actuating force is reduced in release of the mechanism, the expansive action of the main spring resistance H will force the friction shell and friction shoes outwardly until movement of the shell is limited by engagement with the flanges 19 of the cage. Movement of the shoes outwardly with respect to the shell will be limited by engagement of the shoulders of the wedge block with the lugs 26 of the friction shell. During outward movement of the shell, the spring resistance J will be forced outwardly also and due to the expansion of the spring resistance J the main follower G will be forced outwardly until movement thereof is limited by the retainer bolt N. In this position of the parts, the main follower is spaced from the front end of the wedge block as clearly shown in Figure 1.

From the preceding description taken in connection with the drawings, it will be evident that I have provided an exceedingly simple and efficient friction shock absorbing mechanism having two stages of graduated spring action followed by heavy friction resistance, thereby particularly adapting the device for passenger equipment. It is further pointed out that I have provided an exceedingly simple and efficient means for anchoring the main follower to the friction shock absorbing mechanism proper and that the inner coil of the central member of the spring resistance in addition to serving as shock absorbing means also performs the important function of compensating for wear of the various friction wedge faces of the mechanism by forcibly holding the friction shoes always in contact with the wedge block and friction shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage; of a friction shell, said shell and cage being relatively movable, said movement of the cage and shell being limited to less than the full compression stroke of the mechanism; friction elements having sliding engagement with the shell; spreading means cooperating with the friction elements; spring resistance means opposing relative movement of the shell and cage, said spring resistance also opposing relative movement of the shell and friction elements; a main follower normally spaced from the spreading member, said shell and main follower being relatively movable toward and away from each other; spring resistance means reacting between and having its opposite ends buttressed on the main follower and friction shell, respectively, and opposing relative movement of the shell and follower; and means for limiting longitudinal separation of the friction shell and follower.

2. In a friction shock absorbing mechanism, the combination with a spring cage; of a friction shell, said shell and cage being relatively movable, relative movement of said cage and shell being limited to less than the full compression stroke of the mechanism; friction shoes cooperating with the friction shell; a wedge cooperating with the shoes; spring resistance means opposing relative movement of the shell and cage, said spring resistance also opposing relative movement of the shell and shoes; a main follower normally spaced from the wedge member, said main follower and spring cage being relatively movable; means for anchoring the wedge to the casing; spring resistance means abutting the main follower and shell and opposing relative movement thereof; and means connected to the main follower and having engagement with the shoes for anchoring the follower to the friction shell and limiting relative separation of the same.

3. In a friction shock absorbing mechanism, the combination with relatively movable main follower members; of a friction shell movable with respect to one of said follower members to an extent less than the full compression stroke of the mechanism; friction means cooperating with the shell and movable with respect to the same; spring resistance means opposing relative movement of the shell and last named follower member and also opposing relative movement of the shell and the friction means; and additional spring means of lesser capacity interposed between said shell and the other follower member directly opposing relative movement thereof and normally holding said follower spaced from the friction means a distance less than the full compression stroke of the mechanism to provide for preliminary light resistance during relative approach of said follower and friction means.

4. In a friction shock absorbing mechanism, the combination with relatively movable front and rear followers; of a friction shell movable with respect to said rear follower to an extent less than the full compression stroke of the mechanism, said shell having spring abutment flanges at the inner end thereof; means normally spaced from and actuated by the front follower having frictional engagement with the shell and movable relatively thereto lengthwise of the mechanism; spring resistance means having the rear end thereof buttressed against said rear follower and the front end buttressed against the friction shell and friction shoes, said spring opposing relative movement of the friction shell and said rear follower, and movement of the friction shoes with respect to the shell; and an additional spring resistance means interposed between and buttressed at opposite ends against said abutment flanges and front follower, respectively, and opposing relative approach of the front follower and friction shell toward each other lengthwise of the mechanism.

In witness that I claim the foregoing I have hereunto subscribed my name this 29th day of July, 1929.

STACY B. HASELTINE.